May 10, 1932.  M. C. SPENCER  1,857,411
MEANS FOR OPERATING POLYPHASE MOTORS FROM A SINGLE PHASE SOURCE
Filed Nov. 21, 1929

Inventor,
Millard Cole Spencer,
By *Samuel W. Balch*
Attorney.

Patented May 10, 1932

1,857,411

UNITED STATES PATENT OFFICE

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY

MEANS FOR OPERATING POLYPHASE MOTORS FROM A SINGLE-PHASE SOURCE

Application filed November 21, 1929. Serial No. 408,726.

As is well understood, a two-phase induction motor may be operated from a single-phase source of power by connecting a condenser in series with one of the motor windings. A suitable size of condenser may be selected so that the operation of the motor under normal full load running conditions will be substantially the same as if the motor were operated from a two-phase source of power. With such a condenser connected in series with one of the motor windings, under starting conditions, the starting torque of the motor will be low,—on the order of ten or fifteen per cent. A condenser of suitable size for normal full-load running conditions, will, under starting conditions, allow only a current equal approximately to the normal running current to flow through that circuit at starting. In order to obtain good starting torque on the order of one hundred per cent. of the normal full load running torque or more, it is necessary that a current equal to three or four times the normal running current should flow through each of the motor windings. Sufficient current will flow through the motor winding which is connected directly to the line, but the condenser has the effect of holding back the current in the winding with which it is connected is series.

The object of this invention is to provide a means for increasing at starting the current which flows through the winding connected in series with the condenser. By connecting a coil having a suitable inductance in series with the condenser and one of the motor windings at starting, the current flowing through this circuit can be increased to a value equal to three or four times the normal full-load running current, and the starting torque increased to one hundred per cent. or more. When the motor is up to speed this inductance coil may be short-circuited and the motor will continue to run under normal conditions.

In the accompanying sheet of drawings which forms a part of this description.

Figure 1:
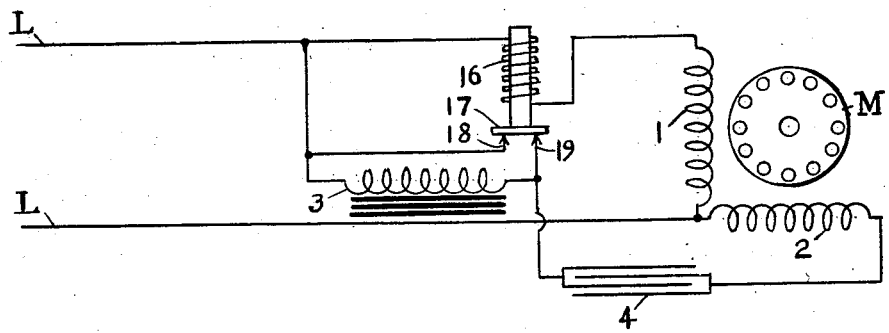
Figure 1 is a connection diagram for a motor operated in accordance with this invention.

Referring first to Fig. 1, leads L, L are a source of single-phase current supply for a two-phase alternating current motor with a squirrel-cage rotor M. The motor is provided with two windings, the first of which 1 is connected substantially directly to the source of supply. The second motor winding 2 is displaced in position ninety electrical degrees with respect to the first winding, and is connected to the source of supply through a condenser 4 of suitable size for normal full load running conditions and an inductance coil 3. A solenoid coil 16 of the solenoid operated switch 17 is connected in series with the motor winding 1. The modifying effect of this coil on the current flowing through the motor winding is slight and may be disregarded. The switch 17 closes contacts 18, 19 which are connected to the two ends of the inductance coil 3. Under normal conditions with no current flowing the contacts 18, 19 are connected by the switch 17. When the motor is connected to the line at starting a heavy current flows through the solenoid 16 and the motor winding 1. This heavy current flowing through the solenoid 16 causes the switch to open the contacts 18, 19 and insert the inductance coil 3 in series in the circuit with the condenser 4 and the motor-winding 2. The addition of the inductance coil 3, if of the correct size, reduces the effective impedance of the circuit, brings the circuit nearly into resonance and causes a greatly increased current to flow through the motor winding 2, and develops a high starting torque. When the motor comes up to speed the current flowing through the solenoid 16 drops back to normal and allows the switch to close the contacts 18, 19 and short-circuit the inductance coil 3, thus removing it from the circuit.

In order that the inductance coil 3 may increase the current at starting to the desired amount, and still maintain the correct phase relation, the amount of the inductance of the coil 3 must be of the correct value suited to the particular motor and condenser with which it is to be used. A suitable value for the inductance of the coil 3 may be determined by means of a vector diagram as shown in Fig. 2 for starting conditions.

Figure 2:
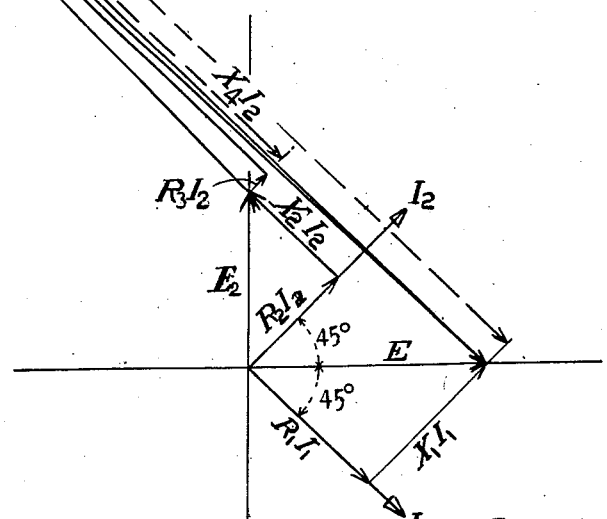
Fig. 2 is a vector diagram for such a motor under starting conditions.

With reference to Figs. 1 and 2, let $R_1$ = effective resistance of motor winding 1,
$X_1$ = effective inductive reactance of motor winding 1,
$I_1$ = current at starting in motor winding 1,
$R_2$ = effective resistance of motor winding 2,
$X_2$ = effective inductive reactance of motor winding 2,
$I_2$ = current at starting in motor winding 2,
$R_3$ = effective resistance of inductance coil 3,
$X_3$ = effective inductive reactance of inductance coil 3,
$R_4$ = effective resistance of condenser 4,
$X_4$ = effective condensive reactance of condenser 4.

In the vector diagram of Fig. 2, vector E represents the electromotive force of the single-phase source of power. Vector $I_1$ represents the current at starting in motor winding 1, which is connected directly to the source. This current $I_1$ lags behind the voltage E by approximately forty-five degrees. Vector $R_1I_1$ represents the voltage necessary to overcome the effective resistance drop in the motor winding 1, and is in phase with the current $I_1$. Vector $X_1I_1$ represents the voltage necessary to overcome the effective inductive reactance drop in the winding 1, and is at right angles to the current vector $I_1$. Vector $I_2$ represents the current in motor winding 2, and for ideal starting condition is equal to $I_1$, and leads the voltage E by forty-five degrees, and the current $I_1$ by ninety degrees. Vector $R_2I_2$ represents the voltage necessary to overcome the effective resistance drop in motor winding 2, and vector $X_2I_2$ represents the inductive reactive drop. Vector $E_2$ represents the voltage across the motor winding 2 and is at ninety degrees to voltage E. The vectors thus far described represent the voltage relation within the motor itself and must be substantially as shown if high starting torque is to be obtained. For high starting torque the current $I_2$ should be at least three or four times the normal full load current. In order to obtain good running performance for the motor, a condenser 4 of size suitable for the normal full load running current of the motor is desired. With only the condenser connected in series with the motor winding as heretofore employed a high voltage is required to force the large starting current $I_2$ through the relatively small condenser 4. This voltage is represented by the vector $X_4I_2$. By connecting an inductance coil 3 in series with the condenser the high current $I_2$ may be caused to flow through the circuit. This result is obtained by bringing the circuit nearly into resonance by adding the inductance coil 3. The inductive reactance of coil 3 together with inductive reactance of the motor winding 2 serves to nearly neutralize the condensive reactance of the condenser 4, thus reducing the total effective impedance of the circuit and enabling the relatively low line voltage E to cause the large current $I_2$ to flow through the circuit. In order to enable the high current $I_2$ to flow through the circuit and at the same time to maintain the desired phase relation for $I_2$ the inductive reactance drop of the inductance coil 3 for the current $I_2$ must be equal to the vector $X_3I_2$ as shown. That is, the inductive reactance drop $X_3I_2$ of the coil 3 plus the inductive reactance drop $X_2I_2$ of the motor winding 2, must neutralize a large portion of the condensive reactance of the condenser 4, leaving just sufficient condensive reactance to give the desired phase relation for $I_2$ as shown. The inductance coil 3 will have a small effective resistance drop $R_3I_2$ and the condenser 4 a small resistance drop $R_4I_2$ in phase with the current $I_2$ as shown.

I claim—

1. A two-phase induction motor supplied from a single-phase source, a condenser and an inductance coil in series with one of the motor windings, and means for cutting the inductance coil out of the circuit when the motor comes up to speed.

2. A two-phase induction motor supplied from a single-phase source, a condenser and an inductance coil in series with one of the motor windings, and automatic means for cutting the inductance coil out of the circuit when the motor comes up to speed.

3. A two-phase induction motor supplied from a single-phase source, a condenser and an inductance coil in series with one of the motor windings, and a switch operated by the current in the other motor winding for cutting the inductance coil out of the circuit when the motor comes up to speed.

4. A two-phase induction motor supplied from a single-phase source, a condenser and an inductance coil in series with one of the motor windings in which the inductive reactance of the inductance coil plus the inductive reactance of the motor winding are sufficient to partially neutralize the condensive reactance of the condenser and leave a resultant condensive reactance to give the current in the circuit the desired phase relation at starting, and means for cutting the inductance coil out of the circuit when the motor comes up to speed.

5. A two-phase induction motor supplied from a single-phase source, a condenser of small capacity and suitable size for running conditions in series with one of the motor windings, an inductance coil of sufficient reactance for an approximately tuned circuit effect in series with the condenser, and means for cutting the inductance coil out of the circuit when the motor comes up to speed.

MILLARD COLE SPENCER.